United States Patent
Hahn et al.

(10) Patent No.: US 6,705,078 B2
(45) Date of Patent: Mar. 16, 2004

(54) METHOD AND DEVICE FOR CONTROLLING A $NO_x$ STORAGE CATALYST THAT IS ARRANGED IN AN EXHAUST GAS CHANNEL OF A COMBUSTION ENGINE

(75) Inventors: Hermann Hahn, Hannover (DE); Sören Hinze, Braunschweig (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 10/182,014
(22) PCT Filed: Jan. 18, 2001
(86) PCT No.: PCT/EP01/00538
§ 371 (c)(1),
(2), (4) Date: Aug. 9, 2002
(87) PCT Pub. No.: WO00/76636
PCT Pub. Date: Dec. 21, 2000

(65) Prior Publication Data

US 2003/0037540 A1 Feb. 27, 2003

(30) Foreign Application Priority Data

Jan. 26, 2000 (DE) .......................... 100 03 219

(51) Int. Cl.[7] .................................. F01N 3/00
(52) U.S. Cl. ........................ 60/285; 60/274; 60/276; 60/295; 60/297
(58) Field of Search .................. 60/274, 276, 277, 60/285, 295, 297

(56) References Cited

U.S. PATENT DOCUMENTS

| | | | | |
|---|---|---|---|---|
| 5,713,199 A | * | 2/1998 | Takeshima et al. | ............ 60/276 |
| 5,771,686 A | * | 6/1998 | Pischinger et al. | ............ 60/274 |
| 6,026,640 A | * | 2/2000 | Kato et al. | ...................... 60/274 |
| 6,134,883 A | * | 10/2000 | Kato et al. | ...................... 60/274 |
| 6,279,372 B1 | * | 8/2001 | Zhang | .......................... 73/1.07 |
| 6,308,515 B1 | * | 10/2001 | Bidner et al. | .................. 60/274 |
| 6,318,075 B1 | * | 11/2001 | Gunther et al. | ................ 60/285 |

FOREIGN PATENT DOCUMENTS

| | | |
|---|---|---|
| WO | WO 00/76636 | 12/2000 |

* cited by examiner

*Primary Examiner*—Binh Tran
(74) *Attorney, Agent, or Firm*—Norris McLaughlin & Marcus

(57) ABSTRACT

The invention relates to a method for controlling a $NO_x$ storage catalyst by means of a $NO_x$-sensitive measuring device, especially a $NO_x$ sensor, that is arranged downstream in relation to the $NO_x$ storage catalyst which is arranged in an exhaust gas channel of a combustion engine. According to the invention, a reference time ($t_0$) is determined by means of a signal path of the $NO_x$-sensitive measuring device (18) after the combustion engine (10) has been switched into a lean operating mode. Said reference time is used as the timely starting point for controlling processes being related to the $NO_x$ storage catalyst (16). The invention also relates to a device for carrying out the method. According to said device, means are provided by means of which the following procedure steps can be carried out: determining a reference time ($t_0$) by means of a signal path (SV) of the $NO_x$-sensitive measuring device (18) after regeneration of the $NO_x$ storage catalyst (16) and using the reference time ($t_0$) as the timely starting point for controlling processes of the $NO_x$ storage catalyst (16).

19 Claims, 2 Drawing Sheets

METHOD AND DEVICE FOR CONTROLLING A $NO_x$ STORAGE CATALYST THAT IS ARRANGED IN AN EXHAUST GAS CHANNEL OF A COMBUSTION ENGINE

BACKGROUND OF THE INVENTION

The invention relates to a method and a device for controlling a $NO_x$ storage catalyst which is arranged in an exhaust gas channel of an internal combustion engine by means of a $NO_x$-sensitive measuring device, a particular a $NO_x$ sensor, that is arranged downstream of the $NO_x$ storage catalyst.

It is known to place $NO_x$ storage catalysts in an exhaust channel of internal combustion engines for post-processing exhaust gases of temporarily lean-running internal combustion engines. These $NO_x$ storage catalysts store nitrogen oxides present in the exhaust gas during lean operating phases of the internal combustion engine. The $NO_x$ storage catalyst is periodically subjected to a $NO_x$ regeneration to restore the initial $NO_x$ storage capacity, for which purpose the catalyst is exposed to a rich exhaust gas atmosphere. Desorbed $NO_x$ is reduced by the reducing exhaust gas components carbon monoxide CO and non-burned hydrocarbons HC to nitrogen $N_2$. It is also in necessary to perform after extended time intervals a desulphurization of the $NO_x$ storage catalyst to remove unwanted sulfate deposits. Desulphurization is typically also performed by exposing the catalyst to a rich exhaust gas while the temperature is adjusted to above 600° C.

It is also known to control $NO_x$ storage catalysts, in particular the $NO_x$ regeneration and desulphurization of these catalysts, with $NO_x$ sensors located downstream of the $NO_x$ storage catalyst. $NO_x$ breakthrough can be detected and a $NO_x$ regeneration can be initiated by measuring the $NO_x$ concentration after the catalyst.

EP 0 916 941 A describes a method for detecting a $NO_x$ storage activity of a $NO_x$ storage catalyst with a downstream $NO_x$ sensor. After the internal combustion engine is switched into a lean mode, a signal that depends on the $NO_x$ concentration is measured and its curve form dependence analyzed to determine a reference time for monitoring the storage activity. As a criterion for determining the reference time an absolute minimum of the signal form within a predetermined wait time after switch-over of the internal combustion engine is used. In particular, the height of the signal of the $NO_x$ sensor is used to correct the offset of the sensor. WO 00/76636 describes a method for calibrating a $NO_x$ sensor, wherein likewise a minimum in the signal form after switch-over of the internal combustion engine into a lean mode is used for a correction of the offset.

The $NO_x$ storage catalyst can be controlled even more precisely if the $NO_x$ regeneration and desulphurization time intervals are not matched to an actual $NO_x$ concentration after the $NO_x$ storage catalyst, but to a quantity of $NO_x$ that had passed through the $NO_x$ storage catalyst during a lean phase of the internal combustion engine, wherein the $NO_x$ quantity can be determined by integrating the measured $NO_x$ concentration. This concept has the disadvantage that the time at which $NO_x$ is actually stored again after a regeneration phase, is unknown. The time at which the internal combustion engine is switched into the lean mode typically forms the basis for starting the $NO_x$ storage phase. This point in time, however, represents only a coarse approximation of the actual start of the storage process. For example, a time delay is ignored which represents the distance traveled by the exhaust gas between the internal combustion engine and the $NO_x$ storage catalyst. At the start of the lean phase, the $NO_x$ storage catalyst can also be in a temperature range which prevents a reliable storage of nitrous oxides. Another disadvantage is the typical response time associated with modern $NO_x$ sensors, which can cause a delay in the signal change after the $NO_x$ concentration in the vicinity of the sensor has changed. As a result, integration of the $NO_x$ mass flow typically starts too early, which entails a premature start of the regeneration, which can then adversely affect the fuel consumption. Many control processes of the $NO_x$ storage catalyst suffer from the problem that the temporal relationship between an operating point of the internal combustion engine and the behavior of the catalyst is not known.

SUMMARY OF THE INVENTION

It is therefore an object of the invention to propose a method and a device for controlling a $NO_x$ storage catalyst of the aforedescribed type, which takes into account a temporal correlation between an operating state of the internal combustion engine and the measurement from a $NO_x$ sensor located after the $NO_x$ storage catalyst.

The object is solved by the characterizing features of the method of claim 1 and the device of claim 17. According to the method of the invention, it is proposed to perform an analysis of a signal form of the $NO_x$ sensitive measuring device after the internal combustion engine is switched into a lean operating mode, for example, after regeneration of the $NO_x$ storage catalyst, with respect to at least one preset criterion. The time at which at least one of the preset criteria is satisfied, is defined as a reference time for controlling $NO_x$ regeneration and/or desulphurization processes of the $NO_x$ storage catalyst.

According to the invention, at least one of the preset criteria is a transition of a decreasing signal form to a curve with a slope of approximately zero or a positive slope of the signal form and/or a drop of the signal below a predetermined threshold value. A threshold value can be predetermined for the slope. The first criterion corresponds essentially to the presence of a minimum in the signal form of the measuring device, which can, of course, also be determined by other methods for determining a minimum, for example, by a comparison of the magnitude of sequentially measured signal values. The criteria should be preset in such a way that under standard conditions of catalyst and measuring device a reference time can always be determined, so that the control of the $NO_x$ storage catalyst can be enabled.

According to an advantageous embodiment, the signal form of the measuring device for determining the reference time is analyzed immediately at the time when the internal combustion engine is switched into a lean operating mode or only after a short delay. Starting the analysis of the signal form can also require that the $NO_x$ storage catalyst is in a temperature range that is suitable for storing $NO_x$.

According to a particularly advantageous embodiment, the criterion to be satisfied can include a simultaneous drop of the signal below a predetermined threshold value instead of or in addition to a slope of approximately zero or a positive slope of the signal form.

Advantageously, one of the preset criteria may be that the signal level remains below a predetermined threshold value for a predetermined minimum time interval before the signal form is analyzed. This criterion can take into account signal forms which, after a regeneration of the $NO_x$ storage catalyst, have already a relative constant or low level when the internal combustion engine is switched into a lean operating mode, with the level subsequently slowly increasing.

Another criterion can be preset, whereby the measured signal drops below a predetermined threshold value during the analysis. Optionally, this may be required for a certain minimum time duration.

Regardless which of the criteria is/are selected, it can be particularly advantageous with a low signal-to-noise ratio to smooth the signal form before the analysis. This can be done, for example, by averaging adjacent signal values or by other known methods.

According to another embodiment of the invention, a maximum time interval can be defined after the start of the analysis of signal form, wherein if a reference time could not be successfully established based on the aforedescribed criteria after the maximum time interval, then the end time of the time interval is used as the reference time. According to an alternative embodiment, if the time interval has passed unsuccessfully, a renewed regeneration of the $NO_x$ storage catalyst is started, while the reference time is subsequently defined anew. It can also be advantageous to use the information about a prior unsuccessful search for a reference time for additional control processes of the internal combustion engine or the $NO_x$ storage catalyst. For example, such information can be used in a diagnostic test to describe the condition of the catalyst or to enable a lean control of the internal combustion engine.

Preferably, the analysis of the signal form can terminated immediately after the reference time has been determined, and the signal of the measuring device can be evaluated and released for controlling the $NO_x$ storage catalyst.

According to a preferred embodiment, the reference time is used as a start time for beginning the $NO_x$ storage in the $NO_x$ storage catalyst for controlling $NO_x$ regeneration and/or desulphurization of the $NO_x$ storage catalyst. Advantageously, approximately at the reference time, integration of the $NO_x$ mass flow through the $NO_x$ storage catalyst is started and/or the quantity of $NO_x$ stored in the $NO_x$ storage catalyst is calculated.

Under certain circumstances, the signal form at the reference time may be used as an offset for calibrating the measuring device. However, this requires relatively strict criteria for determining the reference time. In particular, the signal form of the measuring device should have an absolute minimum at the reference time.

For a precise and operation-friendly control of the $NO_x$ storage catalyst, the reference time is advantageously determined after each $NO_x$ regeneration and desulphurization of the $NO_x$ storage catalyst.

According to a preferred embodiment of the method, the reference time for controlling the $NO_x$ storage catalyst should be valid until the internal combustion engine is switched again into a lean operating mode or until lean exhaust gases are detected at the location of the measuring device. In this case, a reference time determined in a lean phase is therefore valid until a new search for a reference time is started in a subsequent lean phase. Alternatively, the reference time can also be valid until the internal combustion engine is switched over into a stoichiometric or rich operating mode and/or until the presence of a stoichiometric or rich exhaust gas is detected at the location of the measuring device.

A device is also provided which includes means for performing the process steps for analyzing a signal form of the $NO_x$-sensitive measuring device after the internal combustion engine has been switched into a lean operating mode with respect to at least one preset criterion, wherein at least one of the preset criteria is a transition of a decreasing signal form to a slope of approximately zero or a positive slope of the signal form and/or a drop of the signal below a predetermined threshold value, as well as determining a time when at least one of the preset criteria is satisfied, as a reference time for controlling the $NO_x$ regeneration and/or desulphurization processes of the $NO_x$ storage catalyst.

In a preferred embodiment, these means include a control unit that stores a procedure for controlling in digital form the process steps that control a $NO_x$ storage catalyst. This control unit can be integrated in an engine controller.

Additional advantageous embodiments of the invention are recited as features in the remaining dependent claims.

BRIEF DESCRIPTION OF THE DRAWINGS

A particular embodiment of the invention will now be described with reference to the appended drawings. The drawings show in.

DETAILED DESCRIPTION OF THE PREFERRED EMBODIMENTS

Figure 1:
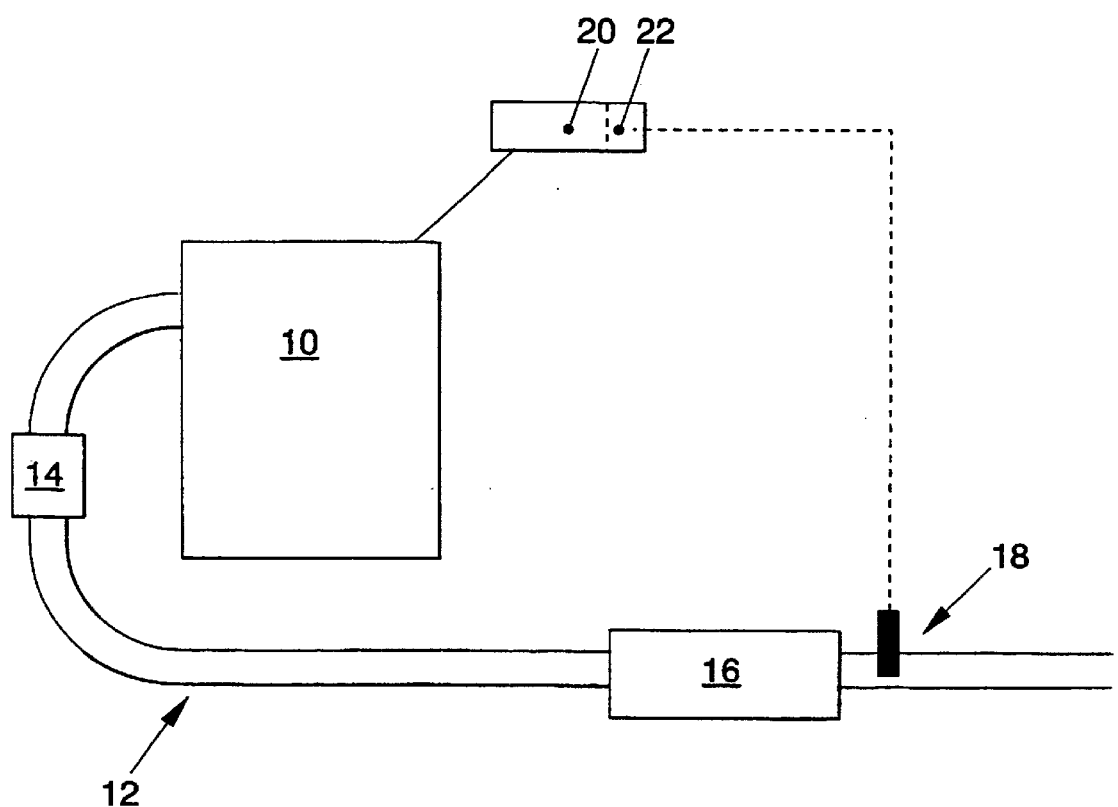
FIG. 1 an arrangement of an exhaust channel of an internal combustion engine, and FIG. 2 a signal form of a $NO_x$ sensor after a regeneration of a $NO_x$ storage catalyst.

The arrangement of an internal combustion engine 10 shown schematically in FIG. 1 includes an exhaust channel 12 with an optional pre-catalyst 14 in the exhaust path 12 and a $NO_x$ storage catalyst 16. A $NO_x$ sensor 18 is arranged in the exhaust channel 12 downstream of the $NO_x$ storage catalyst 16. The $NO_x$ sensor 18 transmits a measurement signal, typically a voltage, which depends on the $NO_x$ concentration after the $NO_x$ storage catalyst 16 and/or on a $NO_x$ fraction in an exhaust gas, to a engine controller 20 with an integrated control unit 22. Based on a stored characteristic curve of the $NO_x$ sensor 18, the control unit 22 determines the $NO_x$ concentration that corresponds to the sensor signal Depending on the determined $NO_x$ concentration, the motor controller 20 controls the internal combustion engine 10, for example, by adjusting the supplied air-fuel mixture. In particular, the motor controller 20 controls switching of the internal combustion engine 10 between a lean ($\lambda$>1) and a stoichiometric or rich operating mode ($\lambda \leq 1$), to thereby control $NO_x$ regeneration of the $NO_x$ storage catalyst 16. A very precise control of the regeneration cycles can be achieved by starting a rich regeneration phase not based on an actual $NO_x$ concentration after the $NO_x$ storage catalyst, but based a total quantity of $NO_x$ that passed through the $NO_x$ storage catalyst 16 during a lean phase. This can be calculated by integrating the signal of the $NO_x$ sensor 18 over the duration of the lean phase. However, no method has so far been reported wherein the time of storing nitrogen oxides in the $NO_x$ storage catalyst 16 actually begins after the internal combustion engine 10 is switched into the lean mode, when integration of the $NO_x$ sensor 18 should reasonably begin.

FIG. 1 shows a simplified temporal signal form of an output signal OUT of a $NO_x$ sensor 18 during a switch from a rich regeneration mode R into a lean operating mode M of the internal combustion engine 10. During the $NO_x$ regeneration R, the sensor signal OUT remains at a relatively high level (region 30). This can be attributed, on one hand, to an incomplete reduction of the desorbed nitrogen oxides $NO_x$ and, on the other hand, to a generation of ammonia $NH_3$ during the regeneration R, to which the $NO_x$ sensor 18 also responds. The sensor signal OUT initially remains at this high level for a short time after the internal combustion engine 10 is switched into the lean mode M at a time $t_s$. This is caused by a dead space located between the internal combustion engine 10 and a location of the $NO_x$ sensor 18, through which the exhaust gas has to pass. In addition, the temperature of the $NO_x$ storage catalyst 16 during the switching operation at time $t_s$ is frequently still too high to ensure an optimum $NO_x$ absorption activity. Finally, the $NO_x$ sensor 18 is slow-acting which can cause the sensor 18 to supply a high signal even when lean exhaust gas with little $NO_x$ content is already present at the sensor location. After this delay, the signal form SV has a steep downward slope (region 32) and reaches at a time $t_0$ a minimum min, before slowly increasing again (region 34). This increase is caused by increased loading of the $NO_x$ storage catalyst 16 and a decreasing $NO_x$ storage activity associated therewith. If the integration of the sensor signal OUT has already started when the internal combustion engine 10 is switched over at the time $t_s$ into the lean mode for determining a total $NO_x$. Breakthrough, then the aforedescribed delay phase can introduce a relatively large error. With the method of the invention as well as with the device, the reference time $t_0$ is determined based on the signal form SV of the $NO_x$ sensor 18, which is then used as a start time for control processes related to the $NO_x$ storage catalyst 16. In practice, this reference time $t_0$ should be set equal to the time when $NO_x$ storage in the $NO_x$ storage catalyst 16 begins after a regeneration R.

The reference time $t_0$ is determined by starting the analysis of the signal form SV when the internal combustion engine 10 is switched over into the lean operating mode M or when a lean exhaust gas is present at the location of the $NO_x$ sensor 18. The signal form SV is hereby evaluated using different criteria which are defined in such a way that the reference time $t_0$ can be reliably detected under standard operating conditions during a reasonable time window. The decrease of the signal form SV after the internal combustion engine 10 has been switched over (region 32) into the lean mode M should advantageously be located in the time window for performing the analysis, so that the minimum can be reliably determined. For example, a slope of the signal form is determined during signal analysis at each measurement point and compared with a previous slope. For the exemplary illustrated signal form SV, a strongly negative slope is initially detected in the region 32, the magnitude of which depends on the actual operating point of the internal combustion engine 10. This slope becomes increasingly larger (more positive) and becomes zero at the minimum min of the signal form SV, before turning positive. According to the invention, the transition time from a negative slope to a slope of approximately zero is a sufficient criterion for determining the reference time $t_0$. Immediately after the reference time $t_0$ has been determined, it is used as a start time for control processes of the $NO_x$ storage catalyst 16, for example for starting the integration of the sensor signal OUT. The analysis of the signal form SV is also terminated at this point. Different operating conditions of the internal combustion engine 10 can determine if a further evaluation of the sensor signal OUT is required for controlling the $NO_x$ storage catalyst 16.

Figure 2:
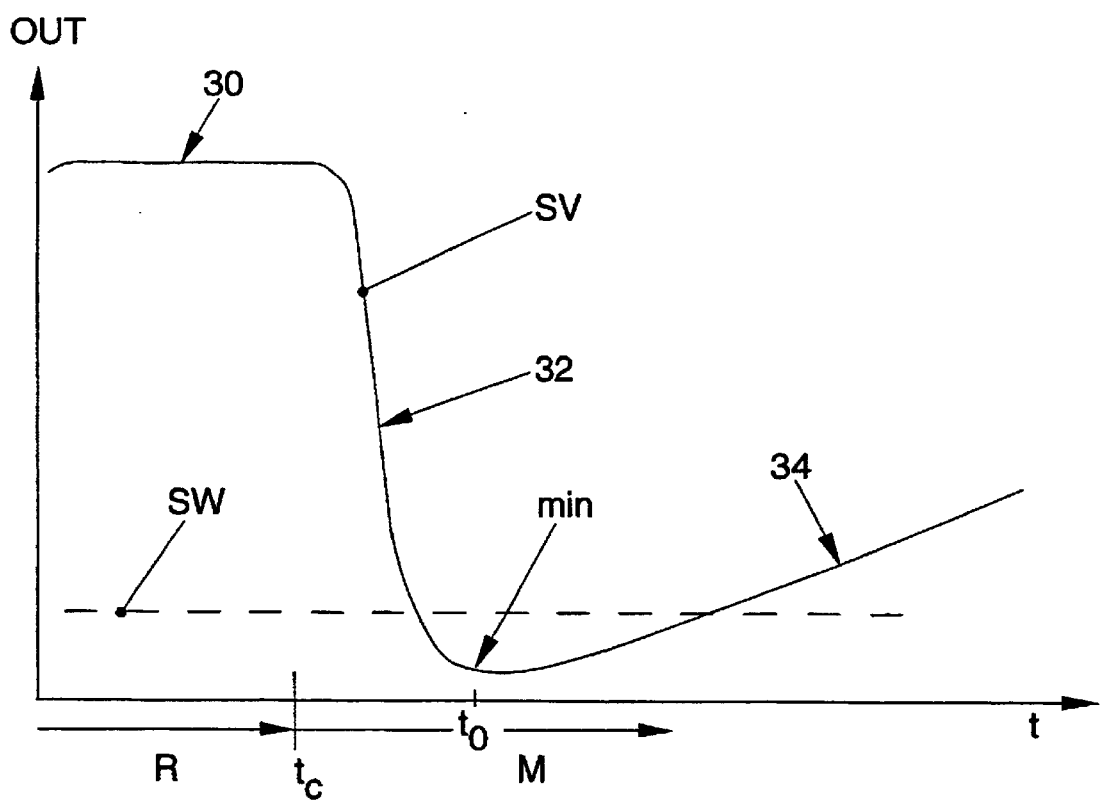

Since not every $NO_x$ sensor 18 has the signal form SV illustrated in FIG. 2, but since, on the other hand, a reference time $t_0$ should be reliably detected after each regeneration R of a $NO_x$ storage catalyst 16, additional criteria for determining a reference time $t_0$ are defined which can take into account differing signal forms SV. For example, a reference time $t_0$ could be considered as having been successfully determined if the signal form SV stays for a predetermined minimum time interval continuously below a predetermined threshold value SW before an analysis of the signal form begins.

What is claimed is:

1. Method for controlling a $NO_x$ storage catalyst disposed in an exhaust gas channel of an internal combustion engine with a $NO_x$-sensitive measuring device, which is arranged downstream of the $NO_x$ storage catalyst, wherein an analysis is performed of a signal form (SV) of the $NO_x$ sensitive measuring device after the internal combustion engine has been switched over into a lean operating mode with respect to at least one preset criterion, chosen from the group consisting of (A) a transition of a decreasing signal form (SV) to a non-negative slope of the signal form (SV) and (B) a drop of the signal below a predetermined threshold value, and wherein a time when at least one of the preset criteria is satisfied, is defined as a reference time ($t_0$) for controlling one or both of the $NO_x$ regeneration and desulphurization processes of the $NO_x$ storage catalyst.

2. The method of claim 1, wherein an analysis of the signal form (SV) of the measuring device is started either (1) when the internal combustion engine is switched to a lean operating mode or (2) after a short delay.

3. The method of claim 1, wherein the preset criteria is a simultaneous drop of the signal below a predetermined threshold value and simultaneously a transition of decreasing signed form (SV) non-negative slope of the signal form (SV) of the measuring device.

4. The method according to claim 1, wherein the preset criterion (B) is a sustained signal level below a predetermined threshold value for a preset minimum time interval from the start of the analysis of the signal form.

5. The method according to claim 1, wherein the preset criterion is (B) a sustained signal level below a predetermined threshold value for a predetermined minimum duration.

6. The method according to claim 1, wherein if a predetermined maximum time interval or a predetermined exhaust gas throughput after the start of the analysis of the signal form (SV) has passed without a successful determination of the reference time ($t_0$), then the reference time ($t_0$) is chosen from the group consisting of time at which the analysis ends, another predetermined time exhaust gas throughput.

7. The method according to claim 1, wherein if a predetermined maximum time interval or a predetermined exhaust gas throughput after the start of the analysis of the signal form (SV) has passed without a successful determination of the reference time ($t_0$), then a renewed regeneration of the $NO_x$ storage catalyst is initiated.

8. The method according to claim 6, wherein if the analysis of the signal form was unsuccessful, then the obtained information is used for one or both of (i) additional control processes of the internal combustion engine and (ii) of the $NO_x$ storage catalyst.

9. The method according to claim 1, wherein the signal form (SV) is smoothed before being analyzed.

10. The method according to claim 1, wherein immediately after the reference time ($t_0$) has been determined, the analysis of the signal form (SV) is terminated and an evaluation of the signal of the measuring device is released for controlling the $NO_x$ storage catalyst.

11. The method according to claim 1, wherein the reference time ($t_0$) is used as a calculation start time for a beginning of $NO_x$ storage of the $NO_x$ storage catalyst for controlling one or both of (i) a $NO_x$ regeneration and (ii) a desulphurization of the $NO_x$ storage catalyst.

12. The method according to claim 1, wherein at the reference time ($t_0$), an activity commences, the activity being chosen as one or more from the group consisting of (i) an integration of a $NO_x$ mass passing through the $NO_x$ storage catalyst and (ii) a calculation of the $NO_x$ mass stored in the $NO_x$ storage catalyst.

13. The method according to claim 1, wherein the signal value at the reference time ($t_0$) is used as an offset for calibrating the measuring device.

14. The method according to claim 1, wherein the reference time ($t_0$) is determined after each $NO_x$ regeneration and desulphurization.

15. The method according to claim 1, wherein the reference time ($t_0$) is valid until an event occurs, the event being chosen from the group consisting of (i) switching over of the internal combustion engine again into a lean operating mode and (ii) lean exhaust gases are present at the location of the measuring device.

16. The method according to claim 1, wherein the reference time ($t_0$) is valid until the internal combustion engine undergoes an event chosen from the group consisting of (i) switching over into a stoichiometric operating mode, (ii) a rich operating mode, (iii) stoichiometric gases being present at the location of the measuring device, (iv) rich exhaust gases being present at the location of the measuring device.

17. Device for determining a $NO_x$ concentration of an exhaust gas flow of an internal combustion engine with a $NO_x$-sensitive measuring device disposed in an exhaust gas channel downstream of a $NO_x$ storage catalyst, comprising means for carrying out the method steps for analyzing with respect to at least one preset criterion a signal form (SV) of the $NO_x$-sensitive measuring device after the internal combustion engine has been switched into a lean operating mode, wherein the preset criteria is chosen as at least one of the group consisting of (A) a transition of a decreasing signal form (SV) to a non-negative slope of the signal form (SV), and (B) a drop of the signal below a predetermined threshold value, as well as determining a time when at least one of the preset criteria is satisfied, as a reference time ($t_0$) for controlling one or both of (a) the $NO_x$ regeneration and (b) desulphurization processes of the $NO_x$ storage catalyst.

18. The device according to claim 17, wherein the means comprise a control unit which stores in digital form a procedure for controlling the method steps for controlling a $NO_x$ storage catalyst.

19. The device according to claim 18, wherein the control unit is integrated in a motor controller.

* * * * *